United States Patent
Hsu

(10) Patent No.: US 10,249,163 B1
(45) Date of Patent: Apr. 2, 2019

(54) MODEL SENSING AND ACTIVITY DETERMINATION FOR SAFETY AND EFFICIENCY

(71) Applicant: OTIS ELEVATOR COMPANY, Farmington, CT (US)

(72) Inventor: Arthur Hsu, South Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/809,418

(22) Filed: Nov. 10, 2017

(51) Int. Cl.
| | |
|---|---|
| G08B 3/10 | (2006.01) |
| G08B 5/36 | (2006.01) |
| G01P 13/00 | (2006.01) |
| G01S 17/42 | (2006.01) |
| G08B 21/02 | (2006.01) |
| G08B 25/10 | (2006.01) |
| G08B 29/18 | (2006.01) |

(52) U.S. Cl.
CPC ............. *G08B 21/02* (2013.01); *G01P 13/00* (2013.01); *G01S 17/42* (2013.01); *G08B 25/10* (2013.01); *G08B 29/186* (2013.01); *G08B 3/10* (2013.01); *G08B 5/36* (2013.01)

(58) Field of Classification Search
None
See application file for complete search history.

(56) References Cited

U.S. PATENT DOCUMENTS

| 731,524 | A | | 6/1903 | Thomas |
|---|---|---|---|---|
| 7,806,589 | B2 | | 10/2010 | Tashman et al. |
| 8,149,126 | B2 | | 4/2012 | Little et al. |
| 8,176,442 | B2 | | 5/2012 | Poot |
| 8,696,458 | B2 | | 4/2014 | Foxlin et al. |
| 9,135,516 | B2 | | 9/2015 | Hoof et al. |
| 9,251,598 | B2 | | 2/2016 | Wells et al. |
| 9,269,151 | B2 | | 2/2016 | Zahand |
| 9,349,040 | B2 | * | 5/2016 | Brickhill ............ G06K 9/00355 |
| 9,383,823 | B2 | | 7/2016 | Geisner et al. |
| 9,714,037 | B2 | * | 7/2017 | DeRuyck .............. B60W 40/09 |
| 2006/0089837 | A1 | * | 4/2006 | Adar .................... H04M 3/2227 705/309 |
| 2007/0041352 | A1 | * | 2/2007 | Frankel .................. B66B 1/468 370/338 |

(Continued)

FOREIGN PATENT DOCUMENTS

| WO | 2015086855 A1 | 6/2015 | |
|---|---|---|---|
| WO | WO-2015135591 A1 * | 9/2015 | ............. B66B 1/468 |

OTHER PUBLICATIONS

Warade et al., "Automated Training and Maintenance Trough Kinect", Research Gate, 2012, 15 pages.

*Primary Examiner* — Fekadeselassie Girma
(74) *Attorney, Agent, or Firm* — Cantor Colburn LLP

(57) ABSTRACT

A system is provided. The system includes a sensor located within a work area of a facility. The sensor detects events in the work area and outputs sensor signals in accordance the events detected in the work area. The system includes a processor communicatively coupled to the sensor. The processor processes the sensor signals utilizing one or more pattern recognition systems. The system includes an interface communicatively coupled to the processor. The interface generating outputs based on each state of the one or more pattern recognition systems.

18 Claims, 3 Drawing Sheets

(56) References Cited

U.S. PATENT DOCUMENTS

| | | | |
|---|---|---|---|
| 2008/0013826 A1* | 1/2008 | Hillis | G06F 3/017 |
| | | | 382/154 |
| 2009/0009320 A1* | 1/2009 | O'Connor | A61B 5/1118 |
| | | | 340/539.12 |
| 2010/0088637 A1* | 4/2010 | Liu | G06F 3/017 |
| | | | 715/810 |
| 2011/0114425 A1* | 5/2011 | Meri | B66B 1/3492 |
| | | | 187/394 |
| 2012/0139731 A1* | 6/2012 | Razoumov | A61B 5/0022 |
| | | | 340/573.1 |
| 2012/0235899 A1* | 9/2012 | Han | G06F 3/017 |
| | | | 345/156 |
| 2013/0077820 A1 | 3/2013 | Marais et al. | |
| 2013/0178960 A1* | 7/2013 | Sheehan | G06F 17/40 |
| | | | 700/91 |
| 2014/0064566 A1* | 3/2014 | Shreve | G06K 9/00335 |
| | | | 382/107 |
| 2014/0277637 A1* | 9/2014 | Ventura | A63K 3/00 |
| | | | 700/91 |
| 2014/0278645 A1* | 9/2014 | Davidson | G06Q 10/063114 |
| | | | 705/7.15 |
| 2015/0009124 A1* | 1/2015 | Antoniac | G06F 3/017 |
| | | | 345/156 |
| 2015/0243013 A1 | 8/2015 | White et al. | |
| 2015/0327794 A1* | 11/2015 | Rahman | A61B 5/744 |
| | | | 600/595 |
| 2016/0194181 A1* | 7/2016 | Wang | B66B 1/468 |
| | | | 348/77 |
| 2016/0311646 A1* | 10/2016 | Bryant | G06K 9/00288 |
| 2016/0353246 A1* | 12/2016 | Elias | H04W 4/029 |
| 2018/0052519 A1* | 2/2018 | Amores-Llopis | G06F 3/017 |

\* cited by examiner

MODEL SENSING AND ACTIVITY DETERMINATION FOR SAFETY AND EFFICIENCY

BACKGROUND

Many types of manual work, whether in a factory or in the field, involve a set of complex steps that embody safety or efficiency implications. Thus, if each of the set of complex steps is not performed correctly or if a worker moves to a location outside a safety region, then safety and efficiency can be compromised.

BRIEF DESCRIPTION

In accordance with one or more embodiments, a system is provided. The system comprises at least one sensor located within a work area of a facility, detecting events in the work area, and outputting sensor signals in accordance with the events detected in the work area. The system comprises a processor communicatively coupled to the at least one sensor and processing the sensor signals utilizing one or more pattern recognition systems. The system comprises an interface communicatively coupled to the processor and generating outputs based on each state of the one or more pattern recognition systems.

In accordance with one or more embodiments or the system embodiment above, the events can comprise movements or gestures by a body of a mechanic.

In accordance with one or more embodiments or any of the system embodiments above, the at least one sensor can comprise a three-dimensional depth sensor.

In accordance with one or more embodiments or any of the system embodiments above, the work area can be on top of an elevator car, in an elevator pit, in an elevator hoistway, inside an elevator cab or in an escalator pit.

In accordance with one or more embodiments or any of the system embodiments above, the interface can comprise a speaker or a light and the outputs can comprise an audio alarm or a visual alarm.

In accordance with one or more embodiments or any of the system embodiments above, the interface can comprise a portable device that wirelessly communicates with the processor.

In accordance with one or more embodiments or any of the system embodiments above, the system can comprise a database providing additional information to the one or more pattern recognition systems of the processor.

In accordance with one or more embodiments or any of the system embodiments above, the database can store at least one of installation procedures, maintenance procedures, safety benchmarks, warning conditions, notification scenarios, and pattern recognition system configurations.

In accordance with one or more embodiments or any of the system embodiments above, the database can store data related to the sensor signals.

In accordance with one or more embodiments or any of the system embodiments above, the one or more pattern recognition systems can comprise at least one state machine that determines whether a sequence of steps was followed.

In accordance with one or more embodiments or any of the system embodiments above, the one or more pattern recognition systems can utilize pattern classifiers, pattern templates, and training data to determine a location and/or an orientation of a body of the mechanic.

In accordance with one or more embodiments, a method is provided. The method comprises detecting, by at least one sensor located within a work area of a facility, events in the work area; outputting, by at least one sensor, sensor signals in accordance the events detected in the work area; processing, by a processor communicatively coupled to the at least one sensor, the sensor signals utilizing one or more pattern recognition systems; and generates, by an interface communicatively coupled to the processor, outputs based on each state of the one or more pattern recognition systems.

In accordance with one or more embodiments or the method embodiment above, the events comprise movements or gestures by a body of a mechanic.

In accordance with one or more embodiments or any of the method embodiments above, the at least one sensor can comprise a three-dimensional depth sensor.

In accordance with one or more embodiments or any of the method embodiments above, the work area can be on top of an elevator car, in an elevator pit, in an elevator hoistway, inside an elevator cab or in an escalator pit.

In accordance with one or more embodiments or any of the method embodiments above, the interface can comprise a speaker or a light and the outputs can comprise an audio alarm or a visual alarm.

In accordance with one or more embodiments or any of the method embodiments above, the interface can comprise a portable device that wirelessly communicates with the processor.

In accordance with one or more embodiments or any of the method embodiments above, a database can provide additional information to the one or more pattern recognition systems of the processor.

In accordance with one or more embodiments or any of the method embodiments above, the database can store at least one of installation procedures, maintenance procedures, safety benchmarks, warning conditions, notification scenarios, and pattern recognition system configurations.

In accordance with one or more embodiments or any of the method embodiments above, the database can store data related to the sensor signals.

In accordance with one or more embodiments or any of the method embodiments above, the one or more pattern recognition systems can comprise at least one state machine that determines whether a sequence of steps was followed.

In accordance with one or more embodiments or any of the method embodiments above, the one or more pattern recognition systems can utilize pattern classifiers, pattern templates, and training data to determine a location and/or an orientation of a body of the mechanic.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A system, method, and computer program product (herein generally a system) for monitoring a work area for safe and efficient operation is provided. In this regard, the system monitors human positions with respect to a path of a moving object in the work area. In turn, the system can generate outputs, e.g., provide notifications to warn humans and stop the moving object to avoid contact when the humans are in the path. Further, the system monitors that proper maintenance or repair procedures (e.g., a set of complex steps) are being performed correctly and in the correct order. In turn, the system can generate outputs, e.g., provide notifications to warn humans that an unsafe work area has been created due to a step being performed incorrectly or out-of-order. The system can be used to verify that a human is wearing required safety equipment (a.k.a. personal protective equipment).

For example, with respect to when a mechanic, construction/installation personnel, and factory worker (generally referred to herein as mechanic) performing installation, maintenance, or repairs an elevator hoistway or an escalator pit, that mechanic must follow a set of complex steps that ensures their safety (e.g., a step of inserting a mechanical blocking device, a step of opening a safety switch before closing hoistway door, etc.) and work efficiency (e.g., a step of adjusting a work tool for up-to-date procedures). During each of the set of complex steps, the system can utilize three-dimensional sensors to detect a mechanic's body orientation and location (even in an unlit environment) and detect other objects (e.g., a door position or a counterweight presence) to ensure no body part is extending outside a safety zone or piece of equipment is creating an unsafe environment.

Figure 1:
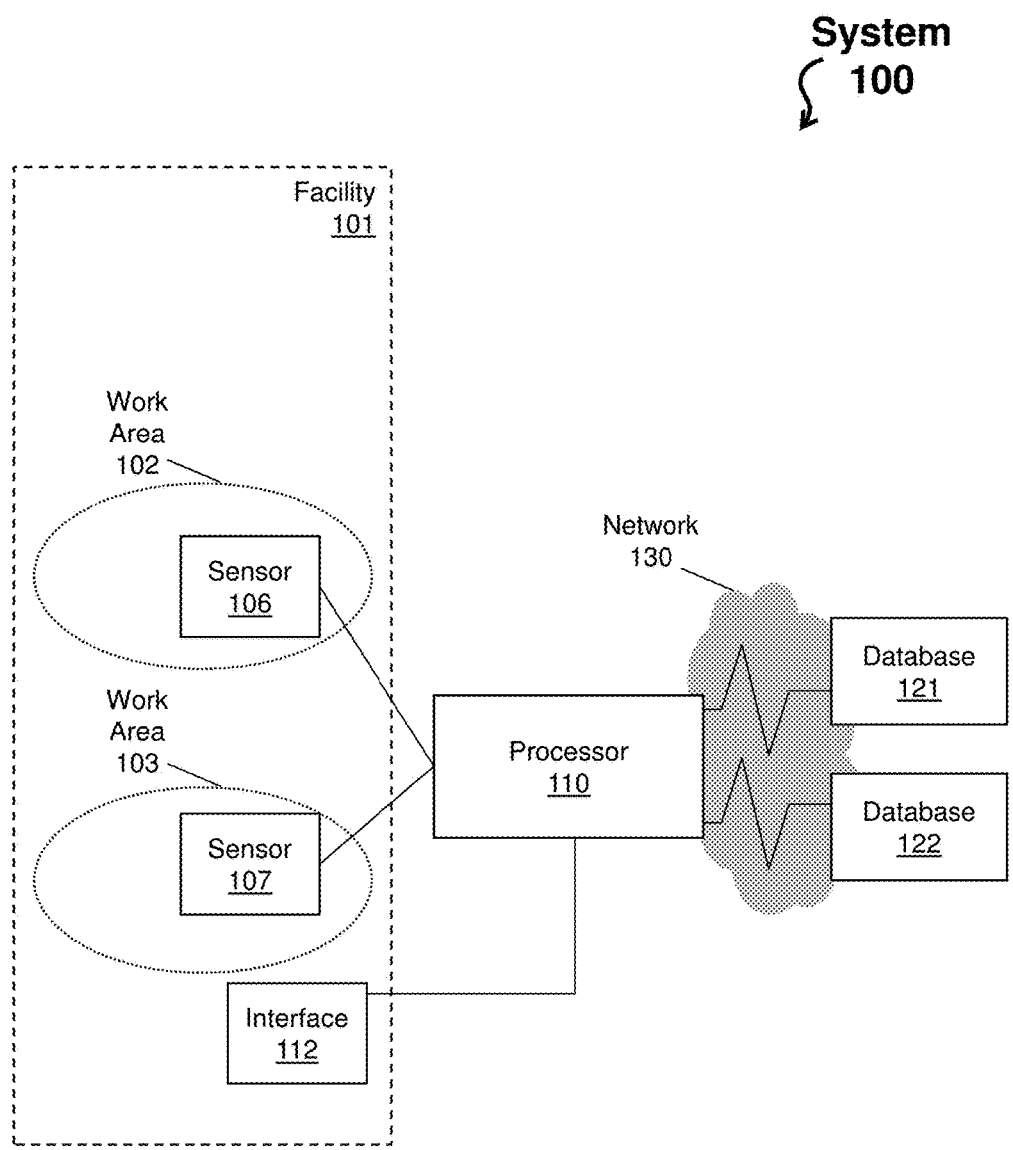
FIG. 1 depicts a system according to one or more embodiments.

Turning now to FIG. 1, a system 100 is depicted according to one or more embodiments. The system 100 comprises a facility 101 (including work areas 102 and 103), sensors 106 and 107, a processor 110, an interface 112, databases 121 and 122, and a network 130. The system 100 is an example and is not intended to suggest any limitation as to the scope of use or operability of embodiments described herein (indeed additional or alternative components and/or implementations may be used). Further, while single items are illustrated for items of the system 100, these representations are not intended to be limiting and thus, any item may represent a plurality of items. In general, the system 100 executes model sensing and activity determination to implement safety and efficiency at the facility 101.

The facility 101 can be any site comprising one or more work areas 102 and 103 for a mechanic to perform installation, maintenance, and/or repairs. Examples of the facility 101 include but are not limited to an office building, a high-rise, a mall, a transportation station, a school, and a hotel. Examples of the work areas 102 and 103 can be the physical space surrounding an elevator or an escalator of the facility 101. For instance, work areas with respect to an elevator include, but are not limited to, within an elevator hoistway (e.g., on top of an elevator car), inside an elevator cab, in the elevator pit, in a machine room, a utility room, and inside the elevator itself. Further, a work area with respect to an escalator can include, but is not limited to, an escalator pit.

The sensors 106 and 107 can be any electro-mechanical component that detect events in an environment (e.g., the work areas 102 and 103) and generate an electrical signal (e.g., sensors signals and/or sensor data) as a function of the events. With respect to the elevator embodiment described herein, the sensor 106 can be located on top of the elevator car to detect events within the elevator hoistway and above the elevator car, while the sensor 107 can be located in the elevator pit to detect events within the elevator hoistway and below the elevator car. Note that an event can include a status of a piece of equipment (e.g., a machine that may continue to be powered on), a phase of a maintenance procedure, an operation of a piece of equipment, and/or events or statuses relevant to a safety of a mechanic.

In accordance with one or more embodiments, the sensors 106 and 107 are three-dimensional depth sensors that determine locations (e.g., x, y, z points) for a body of a mechanic (e.g., appendages or torso) and for other objects. In one embodiment, the sensors 106 and 107 function with precision in any light condition. For example, as a three-dimensional depth sensor, the sensors 106 and 107 can provide a scene with near-infrared light that returns to the sensors 106 and 107 distorted depending upon where things are in the scene. That is, the distorted near-infrared light returning back from the scene can be considered the coded light that the sensors 106 and 107 can read using triangulation, time of flight determination, and signal processing algorithms. In this way, the sensors 106 and 107 can interpret and identify people (the mechanic), their body properties (sensing of the position and orientation of the mechanic's body), their movements and gestures (whether the mechanic has moved outside a safety zone); interpret and classify of objects (such as a hoist rope); and interpret and identify walls, floor, and vacant space. Note that the system 100 leverages a connection between the sensors 106 and 107 and what a human person is doing in the work areas 102 and 103. In this way, the sensors 106 and 107 can determine positions of key body joints and other body parts (e.g., whether each eye is opened, where someone is looking a certain direction) to distinguish if a human is putting some part of their body in an unsafe location.

In accordance with one or more embodiments, the sensors 106 and 107 can be any depth sensor in a vicinity of the work area, such as time-of-flight sensors. A time-of-flight sensor transmits a signal and utilizes a receiver to determine a distance traveled by the signal based on a time between transmission and receipt. Example of time-of-flight sensors include, but are not limited to, any electromagnetic wave (e.g., RADAR) or acoustic signal (e.g., ultrasonic) sensor. For instance, personal protective equipment can be detected by the sensors 106 and 107, and the system 100 can subsequently determine that the personal protective equipment is being worn properly.

Note that a plurality of sensors can be employed at each location to improve a viewing angle when objects, like hoist ropes and mechanical equipment, interfere with a field of view of a single sensor. Other examples of the sensors 106 and 107 include, but are not limited to, video sensors, infrared sensors, depth sensors, motion sensors, and floor mounted pressure sensors.

The processor 110 can include any processing hardware, software, or combination of hardware and software utilized by the system 100 to carry out computer readable program instructions by performing arithmetical, logical, and/or input/output operations. The processor 110 can include a central processing unit and a memory, where the memory stores program code executable by the central processing unit to cause the processor 110 to facilitate monitoring of the work areas 102 and 103 for safe and efficient operation by receiving/processing sensor data and additional information (from the databases 121 and 122) and determining whether the mechanic is following the correct sequence of operations within a prescribed area (e.g., the work areas 102 and 103). In accordance with one or more embodiments, the processor 110 operates one or more pattern recognition systems (in parallel) that receive as inputs the sensor signals and change their state based those sensor signals. For instance, in accordance with one or more embodiments, a pattern recognition system can be a state machine. For example, in accordance with one or more embodiments, at least two state machines can respectively operate in parallel to detect whether a proper process is being followed and whether objects (including the mechanic themselves) are out of harm's way. Note that a state machine is an example of a pattern recognition systems and that state machines are well-suited for recognizing that a sequence of steps have been followed where the inputs could be the recognition of a certain step (e.g., mechanic has blocked open the door) or the change in status of a relevant state (e.g., power is switched on or off, body part is within or outside the path of a counterweight) and states and transitions between states triggered by the inputs define whether or not a proper sequence of steps has been followed.

The interface 112 can be any output mechanism for generating outputs, e.g., warning (or alerting) humans, including the mechanic, that are in a path of a moving object and/or that are in an unsafe work area created due to an installation procedure or a maintenance procedure being performed incorrectly or out-of-order. An example of the interface 112 can include, but is not limited to, a speaker, and an example of the warning can include an audio alarm. Examples of the interface 112 can also include a wearable device (e.g., a head-mounted display or optical head-mounted display); a visual alarm (e.g., a flashing light, signage, or displayed text); and a database that tracks activity for subsequent analysis (e.g., audit purposes, learning what efficient workers do, learning where people spend the most time, etc.). The interface 112 can generate outputs, e.g., output the warnings based on each state of the one or more pattern recognition systems. An example of a human being in a path of a moving object includes when a mechanic has inadvertently positioned themselves in a path of an elevator counterweight. An example of an unsafe work area created due to a maintenance procedure being performed incorrectly or out-of-order includes the closing of the safety chain during a procedural step that requires the safety chain to be open. Note that the interface 112 can be located at a place where the mechanic would be instantaneously notified, i.e., located within the work areas 102 and 103. Thus the interface 112 can be portable (e.g., a beacon or other wearable device), while wirelessly communicating with the processor 110, such that it can move with the mechanic between the work areas 102 and 103. In one embodiment, the interface 112 might be a mobile phone carried by the mechanic. In an embodiment, a plurality of interfaces 112 can be employed in the system 100 (e.g., one for each work area).

In accordance with one or more embodiments, the sensors 106 and 107 and the interface 112 can communicate (whether through wired or wireless communications) with the processor 110 that is located outside the work areas 102 and 103, such as within a machine room controller or in a cloud computing infrastructure. In one embodiment, the processor 110 may be located within the work area 102 and/or work area 103. In this way, the interface 112 can provide immediate feedback with respect to when the sensors 106 and 107 detect that a human or object is in a path of a moving object and/or an unsafe work area has been created.

In accordance with one or more embodiments, the sensor 106 can be integrated with the processor 110 and the interface 112 in the same housing to create a first sensing and warning device. Further, in one embodiment, the sensor 107 can be separately integrated with the processor 110 and the interface 112 in the same housing to create a second sensing and warning device. The first and second sensing device can communicate with each other (whether through wired or wireless communications) and provide immediate feedback to a mechanic with respect to when a human or object is in a path of a moving object and/or an unsafe work area has been created. In one embodiment, the sensors 106 and 107, processor 111, and interface 112, may be joined in any combination of housings or separate.

Each database 121 and 122 can be a computer and/or data server that stores data for use by the processor 110. The databases 121 and 122 can communicate over the network 130. The network 130 is a system of computing components and electrical and radio connections that allow and support communications with nodes thereon (e.g., the database 121 and 122 and the processor 110). In accordance with one or more embodiments, the database 121 can store at least one of installation procedures, maintenance procedures (e.g., sequence of actions for repairing rail alignments, wiring inside a hoistway, malfunctioning junction boxes), safety benchmarks (e.g., location ranges for the work areas 102 and 103), warning conditions, notification scenarios, and pattern recognition system configurations (e.g., pattern recognition systems that utilize pattern classifiers, pattern templates, and training data to detect a state of the system 100, facility 101, and/or work areas 102 and 103; spatiotemporal pattern recognition systems implemented as a state machine). The database 122 can store data related to the sensor signals (e.g., generated by the sensors 106 and 107), whether in the form of raw sensor signals and/or historical sensor data derived from the raw sensor signals. In one embodiment, the database 121 and database 122 can be combined into a single database.

In accordance with one or more embodiments, the system 100 can be integrated in a work or safety suit worn by a human. The work or safety suit can include markers, which facilitate identifying each part of the human's body. Examples of markers include fiducial markers, such as quick-response codes printed on or affixed to the work or safety suit. The sensors 106 and 107 can detect the markers to identify and locate each part of the body.

In accordance with one or more embodiments, the system 100 can utilize a combination of one or more beacons worn at specific locations of the humans' body (e.g., a helmet, bracelets, on a belt, on one or both boots, etc.). The one or more beacons can broadcast signals to one or more receivers (e.g., the sensors 106 and 107). The one or more receivers and/or the one or more beacons themselves can receive and process the signals to determine the position of the one or more beacons.

In accordance with one or more embodiments, the system 100 can utilize wearable sensors, such as an accelerometer. Like the beacons, the wearable sensors can be worn at specific locations of the humans' body (e.g., a helmet, bracelets, on a belt, on one or both boots, etc.). The wearable sensors can provide signals that are used to determine the position and orientation of the wearable sensor (and hence the attached body part).

Figure 2:
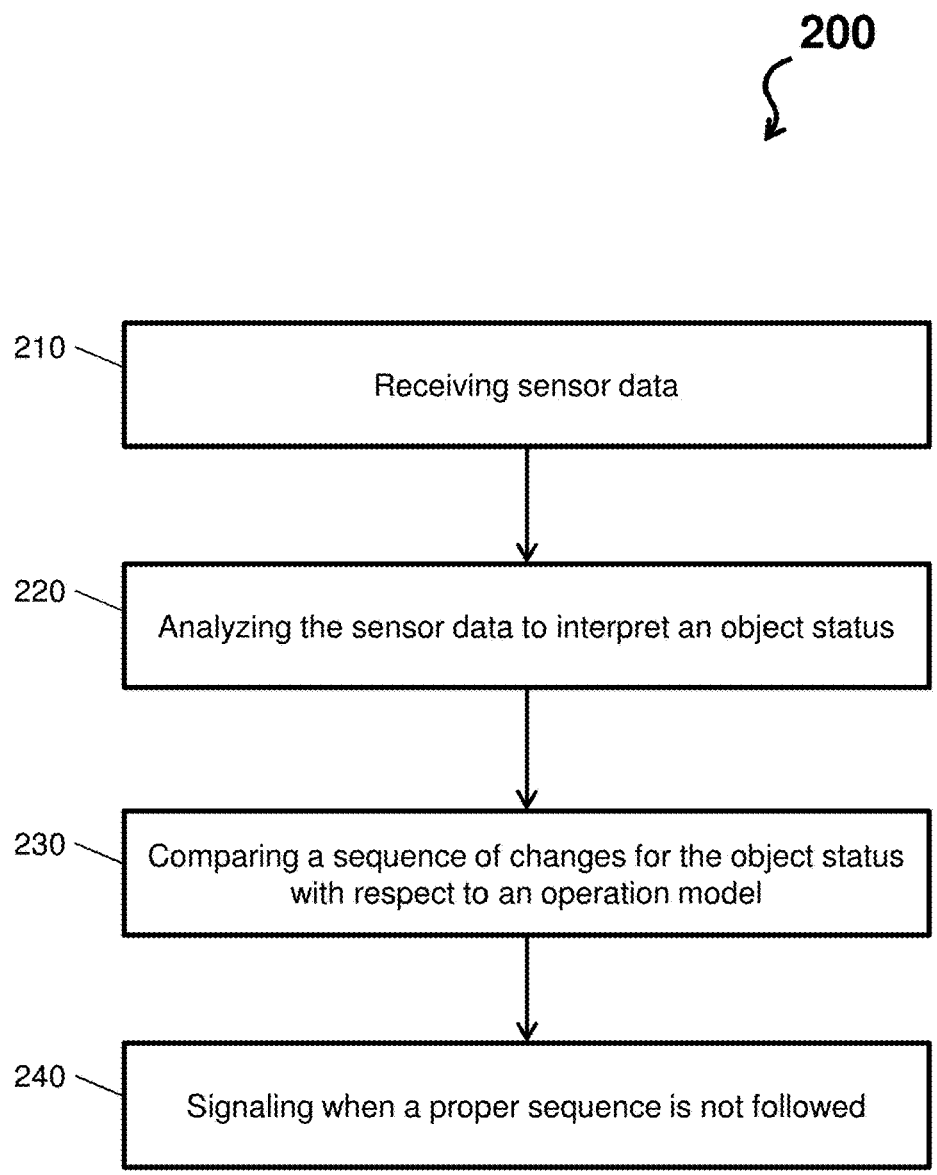
FIG. 2 depicts a process flow according to one or more embodiments.

Turning now to FIG. 2, a process flow 200 is depicted according to one or more embodiments. The process flow 200 is described with respect to FIG. 1 above. The process flow 200 begins at block 210, where the processor 110 receives sensor data. The sensor data can be the electrical signals outputted by the sensor 106 in the work area 102 to the processor 110. Similarly, the sensor data can be the electrical signals outputted by the sensor 107 in the work area 103 to the processor 110. The sensor data can be raw sensor signals or sensor information prepacked by the sensors 106 and 107 themselves.

At block 220, the processor 110 analyzes the sensor data to interpret an object status (e.g., an event). The object status can include one or more appendages of a mechanic (e.g., processing the sensor data/signals to determine a location and/or an orientation of a body) and other objects within the work areas 102 and 103. In accordance with one or more embodiments, the processor 110 performs analytic operations to interpret the status of each object detected by the sensors 106 and 107. The objects can include a door wedge, a counterweight, and human appendages. The status can respectively indicate whether the door wedge is not properly inserted, whether a counterweight is in motion, whether a human appendage is in a path of the counterweight (or outside a safety barrier), or any other safety or job-related item.

At block 230, the processor 110 compares a sequence of changes for the object status with respect to an operation model. For example, the processor 110 can compare the sequence of status changes, such as a motion path of human appendage, with respect to an operation model defined by one or more pattern recognition systems. At block 240, the processor 110 signals when a proper sequence is not followed.

Figure 3:
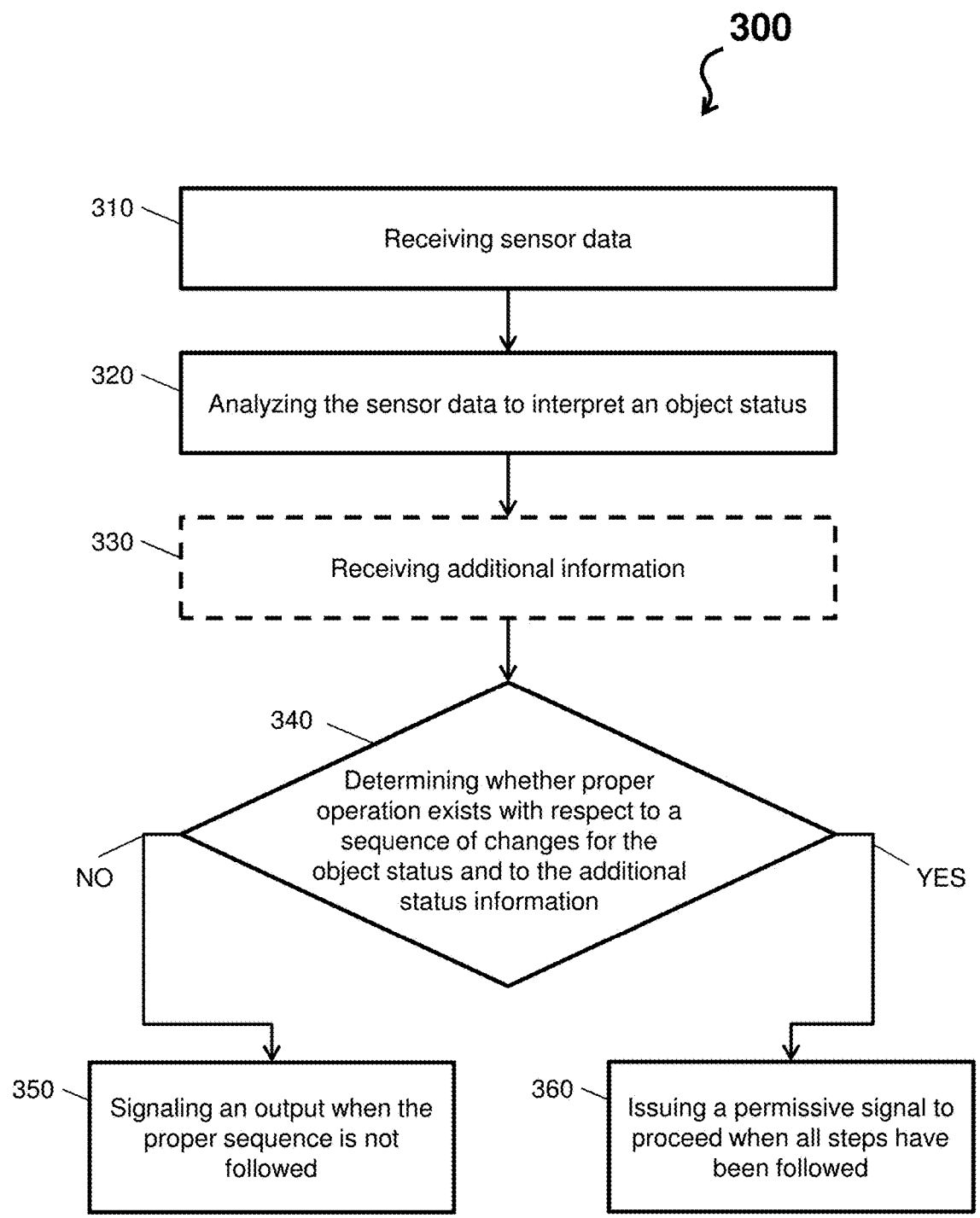
FIG. 3 depicts a process flow according to one or more embodiments.

Turning now to FIG. 3, a process flow 300 is depicted according to one or more embodiments. The process flow 300 is described with respect to FIG. 1 above. The process flow 300 begins at block 310, where the processor 110 receives sensor data. At block 320, the processor 110 analyzes the sensor data to interpret an object status (e.g., an event). Further, the processor 110 can analyze the sensor data to determine at which phase of a maintenance procedure a mechanic is currently on (e.g., an event).

At block 330, the processor 110 receives additional information. The information can be derived from one or more databases 121 and 122. The information can be derived from other components of the system, such as when a top of car stop button is engaged and/or when a data gathered or produced by an elevator/escalator controller. The information can include, but is not limited to, general maintenance standards data (that a certain component can only be used X times or needs to be replaced after Y days) and data specific to equipment (such as the date that a component was last replaced or the number of cycles that the equipment has run since the last maintenance procedure). The receipt of additional status information can be optional, as indicated by the outline of block 330 being a dashed-line.

At decision block 340, the processor 110 determines whether proper operation exists with respect to a sequence of changes for the object status and the additional information. For example, a state machine of the processor 110 can utilize the additional information in combination with the sensor signals to determine whether the mechanic has correctly advanced to a next phase of the maintenance procedure.

The process flow 300 proceeds to block 350 if the proper operation does not exist with respect to the sequence of changes for the object status and to the additional information (as indicated by the NO arrow). At block 350, the processor 110 signals an output when the proper sequence is not followed.

The process flow 300 proceeds to block 360 if the proper operation exists with respect to the sequence of changes for the object status and to the additional information (as indicated by the YES arrow). At block 360, the processor 110 issues a permissive signal to proceed when all steps have been followed.

In accordance with one or more embodiments, the system 100 can determine that any sequence of steps was properly followed (such as an explicit list of steps). For instance, timing-dependent procedures can be by an explicit lists of steps or pattern recognition systems with timing requirement. For example, after a mechanic applies a chemical of a first type, the mechanic must wait for at least X minutes before applying a second coat of the chemical.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   at least one sensor located within a work area of a facility, detecting events in the work area, and outputting sensor signals in accordance with the events detected in the work area;
   a processor communicatively coupled to the at least one sensor and processing the sensor signals utilizing one or more pattern recognition systems; and
   an interface communicatively coupled to the processor and generating outputs based on each state of the one or more pattern recognition systems,
   wherein the one or more pattern recognition systems comprise at least one state machine that determines whether a sequence of steps was followed.

2. The system of claim 1, wherein the events comprise movements or gestures by a body of a mechanic.

3. The system of claim 1, wherein the at least one sensor comprises a three-dimensional depth sensor.

4. The system of claim 1, wherein the work area is on top of an elevator car, in an elevator pit, in an elevator hoistway, inside an elevator cab or in an escalator pit.

5. The system of claim 1, wherein the interface comprises a speaker or a light and the outputs comprise an audio alarm or a visual alarm.

6. The system of claim 1, wherein the interface comprises a portable device that wirelessly communicates with the processor.

7. The system of claim 1, wherein the system comprises a database providing additional information to the one or more pattern recognition systems of the processor.

8. The system of claim 7, wherein the database stores at least one of installation procedures, maintenance procedures, safety benchmarks, warning conditions, notification scenarios, and pattern recognition system configurations or the database stores data related to the sensor signals.

9. The system of claim 1, wherein the one or more pattern recognition systems utilize pattern classifiers, pattern templates, and training data to determine a location and/or an orientation of a body of the mechanic.

10. A method comprising:
   detecting, by at least one sensor located within a work area of a facility, events in the work area;
   outputting, by at least one sensor, sensor signals in accordance the events detected in the work area;
   processing, by a processor communicatively coupled to the at least one sensor, the sensor signals utilizing one or more pattern recognition systems; and
   generating, by an interface communicatively coupled to the processor, outputs based on each state of the one or more pattern recognition systems,
   wherein the one or more pattern recognition systems comprise at least one state machine that determines whether a sequence of steps was followed.

11. The method of claim 9, wherein the events comprise movements or gestures by a body of a mechanic.

12. The method of claim 9, wherein the at least one sensor comprises a three-dimensional depth sensor.

13. The method of claim 9, wherein the work area is on top of an elevator car, in an elevator pit, in an elevator hoistway, inside an elevator cab or in an escalator pit.

14. The method of claim 9, wherein the interface comprises a speaker or a light and the outputs comprise an audio alarm or a visual alarm.

15. The method of claim 9, wherein the interface comprises a portable device that wirelessly communicates with the processor.

16. The method of claim 9, wherein a database provides additional information to the one or more pattern recognition systems of the processor.

17. The method of claim 16, wherein the database stores at least one of installation procedures, maintenance procedures, safety benchmarks, warning conditions, notification scenarios, and pattern recognition system configurations or the database stores data related to the sensor signals.

18. The method of claim 9, wherein the one or more pattern recognition systems utilize pattern classifiers, pattern templates, and training data to determine a location and/or an orientation of a body of the mechanic.

* * * * *